(12) United States Patent
Notargiacomo

(10) Patent No.: US 8,694,034 B2
(45) Date of Patent: Apr. 8, 2014

(54) SYSTEM AND METHOD FOR THE DISTRIBUTION OF RADIO-FREQUENCY SIGNALS

(75) Inventor: Massimo Notargiacomo, S. Agata sul Santerno (IT)

(73) Assignee: John Mezzalingua Associates Holdings B.V., Amsterdam (NL)

( * ) Notice: Subject to any disclaimer, the term of this patent is extended or adjusted under 35 U.S.C. 154(b) by 363 days.

(21) Appl. No.: 13/258,008

(22) PCT Filed: May 17, 2010

(86) PCT No.: PCT/IB2010/001150
§ 371 (c)(1),
(2), (4) Date: Sep. 29, 2011

(87) PCT Pub. No.: WO2010/133942
PCT Pub. Date: Nov. 25, 2010

(65) Prior Publication Data
US 2012/0076500 A1    Mar. 29, 2012

(30) Foreign Application Priority Data

May 19, 2009   (IT) .............................. MO2009A0135

(51) Int. Cl.
*H04B 7/00*   (2006.01)
(52) U.S. Cl.
USPC ..... 455/500; 455/561; 455/562.1; 455/550.1; 455/554.2; 455/422.1; 370/310; 370/328; 370/329; 370/343; 370/338; 343/702
(58) Field of Classification Search
USPC ........... 455/500, 517, 561, 562.1, 550.1, 557, 455/555, 554.1, 544.2, 556.1, 445, 507, 455/509, 514, 515, 426.1, 426.2, 422.1, 455/403, 412.1, 412.2; 370/310, 328, 329, 370/343, 338; 343/702
See application file for complete search history.

(56) References Cited

U.S. PATENT DOCUMENTS

| 5,657,374 A | 8/1997 | Russell et al. |
| 2004/0110534 A1 | 6/2004 | Chung et al. |
| 2008/0174502 A1* | 7/2008 | Oren et al. .................... 343/703 |
| 2012/0014421 A1* | 1/2012 | Wegener ...................... 375/219 |

FOREIGN PATENT DOCUMENTS

| WO | 98/16054 | 4/1998 |
| WO | 2008/012865 | 1/2008 |

OTHER PUBLICATIONS

International Search Report dated Sep. 15, 2010, corresponding to PCT/IB2010/001150.

* cited by examiner

*Primary Examiner* — Keith Ferguson
(74) *Attorney, Agent, or Firm* — Young & Thompson

(57) ABSTRACT

A system for the distribution of radio-frequency signals includes a main unit associated with at least a first radio communication set, at least a remote unit associated with at least a second radio communication set installed in a preset area, for the radio coverage of the area, and a communication channel associated with the main unit and with the remote unit, wherein the main unit (2) and the remote unit have analogue modulation elements of the signals to be sent on the communication channel. The remote unit includes at least a selective amplification unit associated with the second radio communication set and having analogue/digital conversion elements of the signals coming from the main unit, through the communication channel, and/or of the signals coming from the second radio communication set, digital filtering elements of the digital signals coming out of the analogue/digital conversion elements and amplification elements of the signals coming from the main unit, through the communication channel, and/or of the signals coming from the second radio communication set.

26 Claims, 2 Drawing Sheets

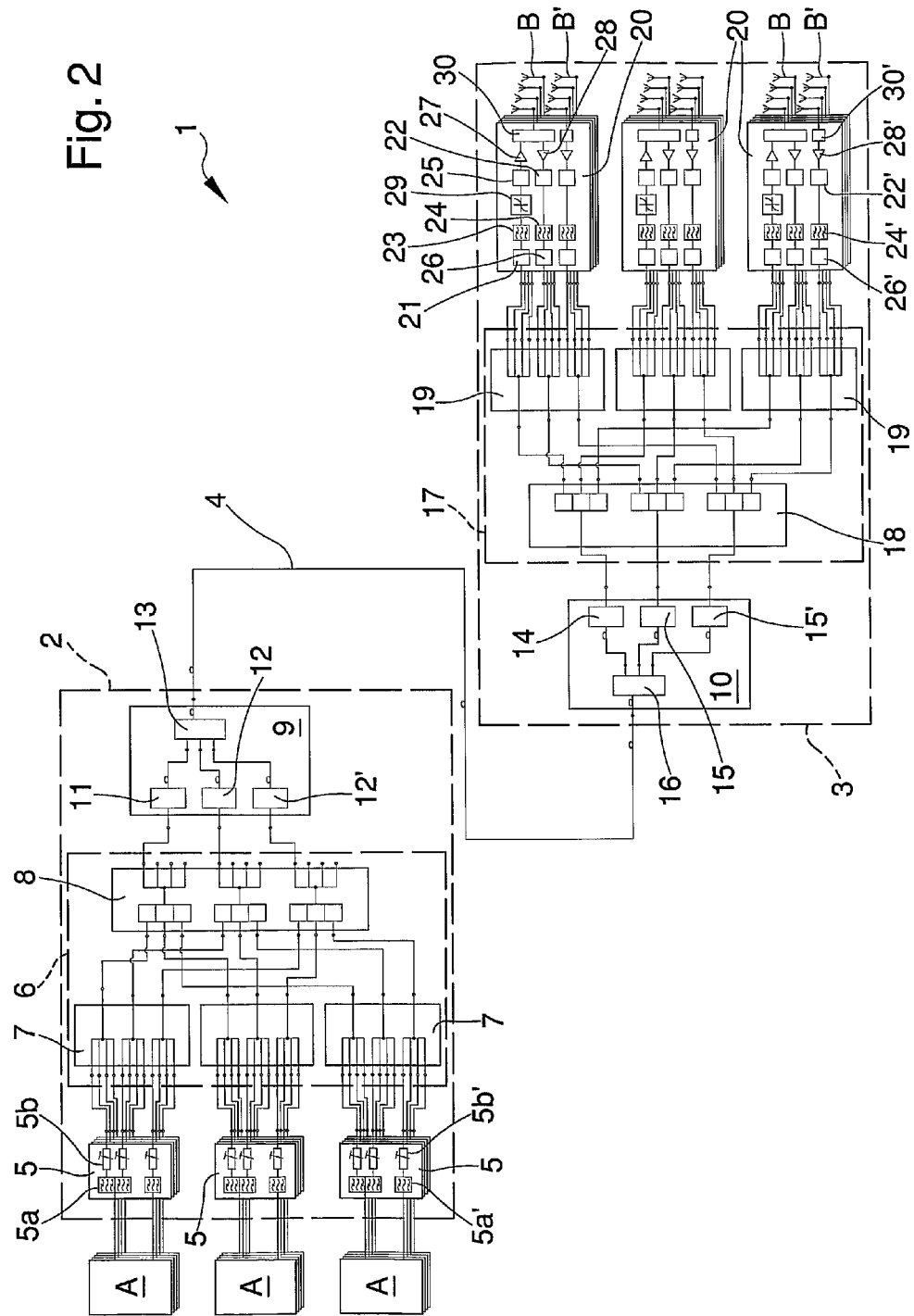

US 8,694,034 B2

SYSTEM AND METHOD FOR THE DISTRIBUTION OF RADIO-FREQUENCY SIGNALS

TECHNICAL FIELD

The present invention relates to a system and a method for the distribution of radio-frequency signals.

BACKGROUND ART

With reference to the telecommunications sector and, in particular, to the mobile phone sector, the use is known of communication systems for both the indoor and outdoor distribution of one or more radio-frequency signals.

The known systems of communication are usable, in particular, to carry out the so-called remotization of the signals coming from one or more base radio stations (Base Transceiver Station) or from similar sets, for the outdoor coverage of signals both within a single frequency band and within several frequency bands and/or for different operators.

The use is further known of so-called DAS (Distributed Antenna System) communication systems for the distribution of signals within buildings, underground railways, airports and, in general, inside all those areas in which it is hard to guarantee adequate radio coverage using conventional methods.

The known communication systems are generally composed of one or more remote units, suitably installed in the proximity of an area in which radio coverage is to be provided, and of a main unit connected to the remote units by means of a communication channel.

Generally speaking, the remote units are provided with respective antennas for the transmission of signals or, in the case of indoor type systems, are connected to a passive signal distribution network.

With particular reference to the remotization of radio-frequency signals, a communication system of known type commonly comprises:
- at least a communication channel in optical fibre connecting the main unit to at least a corresponding remote unit;
- a main unit interfaced with one or more BTS stations or similar sets and suitable for converting the signals coming from the receiver into corresponding optical signals, or vice versa;
- one or more remote units, each of which suitable for converting the optical signals into corresponding electrical signals, or vice versa, and amplifying such electrical signals, before sending them towards a transmission antenna.

In use, first of all, each of the BTS stations present generates a respective signal, within a specific frequency band and for a specific operator, subsequently sent to the main unit.

The main unit converts such electrical signals received into corresponding optical signals and sends them towards a corresponding remote unit through the optical fibre communication channel.

The transmission of the optical signals between the main unit and the remote unit can be made both by means of a modulation of analogue type and by means of a modulation of digital type.

In the first case, the intensity of the optical signal is modulated according to the electrical signal to be transmitted.

In the second case, the main unit performs a conversion from analogue to digital of the electrical signals to be transmitted, before sending these by means of the optical fibre or, alternatively, the electrical signals to be transmitted are delivered by the BTS station to the main unit already in digital format.

The remote unit converts the optical signals received into corresponding electrical signals, which are then amplified and sent to a transmission antenna. The known radio-frequency signal distribution systems have, however, several drawbacks.

In particular, the analogue transmission of the signals from the main unit towards the remote units and, subsequently, towards the antennas, does not allow an independent control of the signals.

This aspect is definitely of considerable importance within the ambit of mobile phones, whenever the need or the demand exists for independent antennas usable for different operators and/or frequency bands; in this case the different signals transmitted must necessarily be made available for the different operators for distribution to the end consumers.

Digital transmission, on the other hand, presents the technical limit of the maximum sampling frequency and, consequently of the band available for the transmission of signals on the optical fibre.

In this case, therefore, the available band is restricted and this makes the system suitable for remotizing signals contained in a narrow frequency band and usable typically in the case of mobile phone application, for just one operator.

Document US 2004/0110534 discloses capacity enhancement schemes for forward and reverse links of distributed cellular base stations consisting of a central unit and one or more remote units.

However, also these known solutions present technical limits.

DESCRIPTION OF THE INVENTION

The main aim of the present invention is to provide a system and a method for the distribution of radio-frequency signals that allow an independent control of the different distributed signals and, at the same time, allow the use of a broad frequency band for the simultaneous transmission of several signals between the main unit and the remote units.

Another object of the present invention is to provide a system and a method for the distribution of radio-frequency signals which allow overcoming the mentioned drawbacks of the state of the art within the ambit of a simple, rational, easy and effective to use as well as low cost solution.

The above objects are all achieved by the present system for the distribution of radio-frequency signals, comprising:
- at least a main unit associated with at least a first radio communication set;
- at least a remote unit associated with at least a second radio communication set installed in a preset area, for the radio coverage of said area;
- at least a communication channel associated with said main unit and with said remote unit;

wherein said main unit and said remote unit have analogue modulation means of the signals to be sent on said communication channel, characterized by the fact that said remote unit comprises at least a selective amplification unit associated with said second radio communication set and having:
- analogue/digital conversion means of the signals coming from said main unit, through said communication channel, and/or of the signals coming from said second radio communication set;
- digital filtering means of the digital signals coming out of said analogue/digital conversion means;

amplification means of the signals coming from said main unit, through said communication channel, and/or of the signals coming from said second radio communication set.

The above objects are all achieved by the present method for the distribution of radio-frequency signals, comprising:
- at least a first reception/transmission phase of signals between a main unit and at least a first radio communication set;
- at least a communication phase with analogue modulation of the signals between said main unit and at least a remote unit, through at least a communication channel;
- at least a second reception/transmission phase of signals between said remote unit and at least a second radio communication set installed in a predetermined area, for the radio coverage of said area;

characterized by the fact that it comprises:
- at least an analogue/digital conversion phase of the signals coming from said main unit, through said communication channel, and/or of the signals coming from said second radio communication set;
- at least a digital filtering phase of said signals, after said analogue/digital conversion phase;
- at least an amplification phase of the signals coming from said remote unit, through said communication channel, and/or of the signals coming from said second radio communication set.

BRIEF DESCRIPTION OF THE DRAWINGS

Other characteristics and advantages of the present invention will become more evident from the description of two preferred, but not sole, embodiments of a system and a method for the distribution of radio-frequency signals, illustrated purely as an example but not limited to the annexed drawings in which:

FIG. 2 is a block diagram of a second embodiment of the system according to the invention.

EMBODIMENTS OF THE INVENTION

Figure 1:
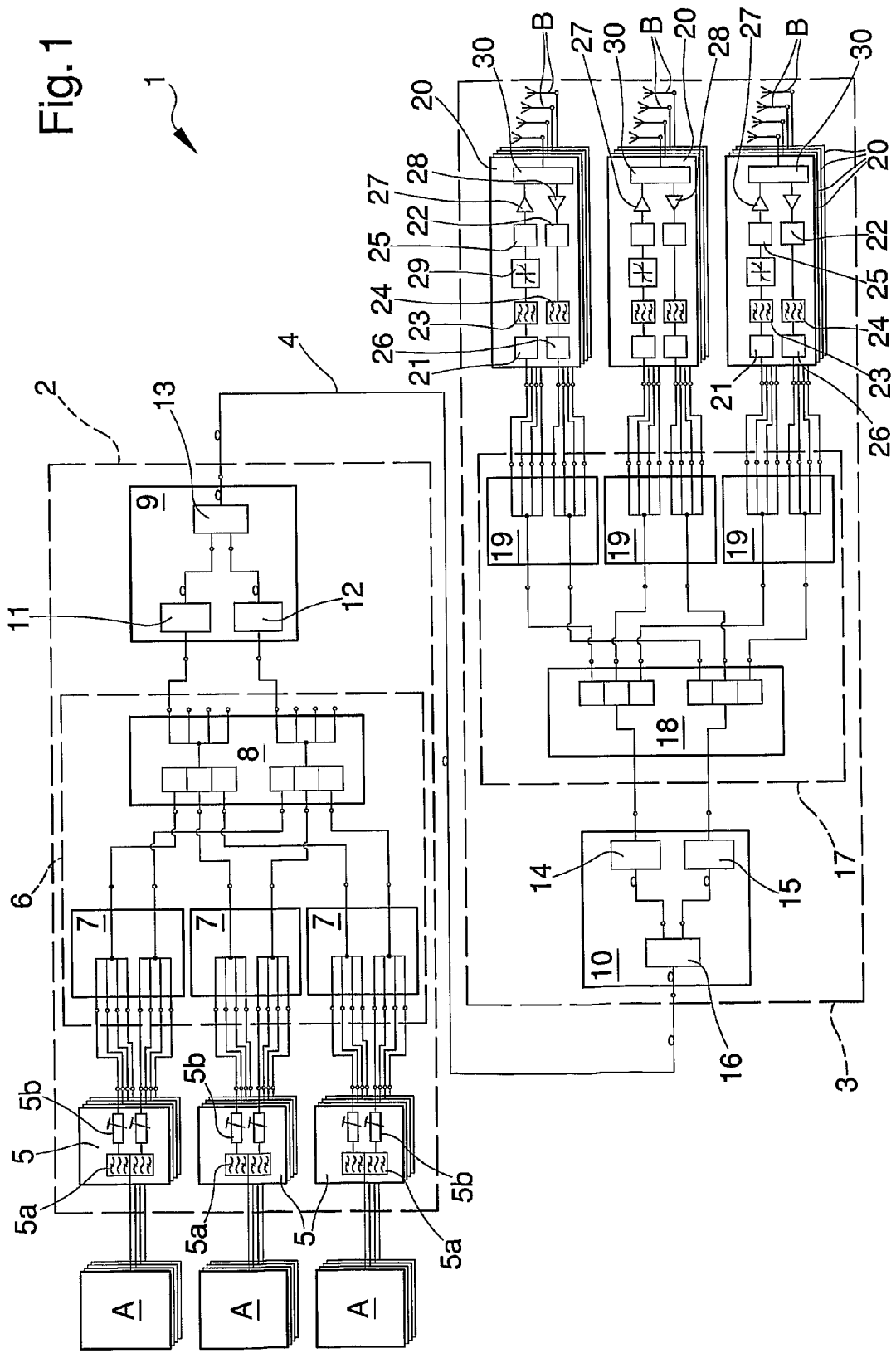
FIG. 1 is a block diagram of a first embodiment of the system according to the invention.

With reference to such figures, globally indicated by 1 is a system for the distribution of radio-frequency signals, that can be used in particular within the ambit of mobile phones for the remotization of the signals coming from a plurality of base radio stations (Base Transceiver Station), for various frequency bands, relating to different communication standards (such as GSM, UMTS or the like), and for different phone operators.

Different applications of the system 1 according to the invention cannot however be ruled out such as, e.g., the indoor distribution of signals in buildings, underground railways, airports and, in general, all those areas where it is hard to ensure adequate radio coverage using conventional methods.

With reference to a first possible embodiment, shown in FIG. 1, the system 1 comprises:
- a main unit, generally indicated by the reference 2, associated with at least a first radio communication set A, composed of a base radio station (Base Transceiver Station) or of a similar appliance;
- at least a remote unit, generally indicated by the reference 3, associated directly or by means of a passive distribution network with a plurality of second radio communication sets B, composed of antennas or the like, suitable for allowing the radio coverage inside a predetermined area;
- a communication channel 4 between the main unit 2 and the remote unit 3, preferably composed of one or more optical fibre cables.

The system 1 comprises one or more remote units 3, suitably distributed in an area where the radio coverage is to be provided, connected to the main unit 2 by means of the communication channel 4.

The main unit 2 comprises a plurality of interface modules 5 connected to respective base radio stations A.

Each base radio station A, in point of fact, produces a respective radio-frequency signal relating to a specific frequency band and to a specific operator, and sends it to the interface modules 5.

The main unit 2 therefore presents a plurality of distinct interface modules 5, each of which suitable for controlling the signals coming from the base radio stations A for just one specific frequency band and for just one operator.

Each of the interface modules 5 can comprise, both at input and output, a filter 5a and an attenuator 5b of the signals received or to be sent.

Usefully, as shown in FIG. 1, each of the interface modules 5 can be associated with a respective base radio station A by means of a single cable usable to simultaneously send or receive radio-frequency signals. Alternatively, the use cannot be ruled out of two distinct cables, a first cable for the signals coming from the base radio station A and sent towards the respective interface module 5 and a second cable for the signals coming from an interface module 5 and sent towards the base radio station A.

The main unit 2 also comprises first combiner/separator means, generally indicated by the reference 6, placed between the interface modules 5 and the communication channel 4.

The first combiner/separator means 6 are suitable for combining a plurality of input signals coming from the respective interface modules 5 into a single output signal to be sent through the communication channel 4 and/or for separating a single input signal coming from the communication channel 4 into a plurality of output signals to be sent to respective interface modules 5.

In particular, the first combiner/separator means 6 comprise three first combiner/separator modules 7 associated with respective groups of interface modules 5.

The use of first combiner/separator modules 7, in different numbers depending on the number of the frequency bands supported by the optical fibre communication channel 4 cannot however be ruled out.

Each of the first combiner/separator modules 7 is suitable for combining a plurality of input signals relating to just one frequency band and to several operators into a single output signal to be sent towards the communication channel 4 and/or for separating just one input signal coming from the communication channel 4 and relating to just one frequency band into a plurality of output signals relating to just one frequency band and to several operators to be sent to respective interface modules 5.

The first combiner/separator means 6 also comprise a second combiner/separator module 8 placed in between the first combiner/separator modules 7 and the communication channel 4.

The second combiner/separator module 8 is suitable for combining a plurality of input signals relating to different frequency bands into a single output signal to be sent through the communication channel 4 and/or for separating a single input signal coming from the communication channel 4 into a plurality of output signals relating to different frequency bands.

Advantageously, the main unit 2 and the remote unit 3 have analogue modulation means for modulating the signals sent on the communication channel 4, composed of a first and a second converter module 9 and 10 respectively, suitable for modulating the intensity of the optical signal sent on the communication channel 4 according to the electrical signals received upstream, and vice versa.

The use of an analogue type modulation of the signals to be sent on the communication channel 4, in particular, allows using a broad frequency band and, therefore, performing the simultaneous transmission/reception of several signals between the main unit 2 and the remote unit 3.

The first converter module 9, in particular, has a first electrical/optical converter 11 suitable for converting an electrical input signal coming from the second combiner/separator module 8 into a corresponding optical output signal to be sent through the optical fibre cable 4, and also has a first optical/electrical converter 12 suitable for converting an optical input signal coming from the optical fibre cable 4 into a corresponding electrical output signal to be sent to the second combiner/separator module 8.

The first converter module 9 also comprises a first multiplexer/demultiplexer 13 for simultaneously sending and receiving optical signals on the optical fibre cable 4, which is associated with the first electrical/optical converter 11 and with the first optical/electrical converter 12 and which uses, e.g., a multiplexing of the WDM (Wavelength Division Multiplexing) type.

The second converter module 10, in the same way, has a second optical/electrical converter 14 suitable for converting an optical input signal coming from the optical fibre cable 4 into a corresponding electrical output signal and, furthermore, it has a second electrical/optical converter 15 suitable for converting an electrical input signal into a corresponding optical output signal to be sent through the optical fibre cable 4.

The second converter module 10 also comprises a second multiplexer/demultiplexer 16 for simultaneously sending and receiving optical signals on the optical fibre cable 4, which is associated with the second optical/electrical converter 14 and with the second electrical/optical converter 15 and which uses, e.g., a multiplexing of the WDM (Wavelength Division Multiplexing) type.

Usefully, the remote unit 3 comprises second combiner/separator means, generally indicated by the reference 17, associated with the communication channel 4.

The second combiner/separator means 17 comprise, in particular, a third combiner/separator module 18 suitable for separating a single input signal coming from the communication channel 4 into a plurality of output signals relating to different frequency bands or, vice versa, for combining a plurality of input signals relating to different frequency bands into a single output signal to be sent through the communication channel 4.

The second combiner/separator means 17 also comprise three fourth combiner/separator modules 19 associated with the third combiner/separator module 18.

The use of fourth combiner/separator modules 19, in different numbers depending on the number of the frequency bands supported by the optical fibre communication channel 4 cannot however be ruled out.

Each of the fourth combiner/separator modules 19 is suitable for separating a single input signal coming from the third combiner/separator module 18 and relating to just one frequency band into a plurality of output signals relating to several operators or, vice versa, for combining a plurality of input signals relating to just one frequency band and to several operators into a single output signal to be sent towards the third combiner/separator module 18.

Advantageously, the remote unit 3 comprises at least a selective amplification unit 20 associated with a respective antenna B and having:
- analogue/digital conversion means for converting the signals coming from the main unit 2, through the communication channel 4, and/or of the signals coming from the antenna B;
- digital filtering means for filtering the digital signals coming out of the analogue/digital conversion means;
- digital/analogue conversion means of the filtered digital signals;
- amplification means for amplifying the signals coming from the remote unit 3, through the communication channel 4, and/or the signals coming from the antenna B.

In particular, each of the remote units 3 used comprises several selective amplification units 20 associated with the fourth combiner/separator modules 19, each of which dedicated to a specific frequency band and to a specific operator.

In point of fact, each selective amplification unit 20 converts into digital signals the analogue signals coming from the communication channel 4 or from the antenna B and, afterwards, filters such digital signals to select the data of interest.

This therefore permits an independent control of the different signals distributed, for each operator and inside each of the frequency bands relating to different frequency bands.

In particular, for each of the selective amplification units 20, the analogue/digital signal conversion means are composed of a first analogue/digital converter 21 for converting the signals coming from one of the fourth combiner/separator modules 19, and of a second analogue/digital converter 22 for converting the signals coming from the antenna B and directed towards the main unit 2.

The digital filtering means are composed of a first and a second digital filter 23 and 24 arranged downstream of the first and the second analogue/digital converter 21 and 22 respectively.

The digital/analogue conversion means comprise a first digital/analogue converter 25 arranged downstream of the first digital filter 23 and a second analogue/digital converter 26 arranged downstream of the second digital filter 24 suitable for converting the filtered digital signals into a corresponding analogue signal before sending towards the antenna B or the fourth combiner/separator modules 19 respectively.

The amplification means of the selective amplification units 20, furthermore, are made up of a first amplifier 27 arranged downstream of the first digital filter 23 and of a second amplifier 28, of the Low-Noise Amplifier type, arranged downstream of the antenna B and upstream of the second analogue/digital converter 22.

Advantageously, with reference to the sending of signals from the base radio stations A to the antennas B, each of the selective amplification units 20 comprises a digital pre-distortion device 29, arranged downstream of the first digital filter 23 and upstream of the first digital/analogue converter 25, suitable for changing the output signal from the first digital filter 23 so as to reduce to the utmost the effect of the amplification disturbances on the end signal due to the first amplifier 27, before the transmission by means of the antenna B.

Each of the selective amplification units 20 also comprises a combiner/separator device 30, of the type of a duplexer or the like, associated with the antenna B and suitable for simultaneously allowing sending and receiving signals.

With reference to a second possible embodiment of the invention, shown in FIG. 2, the system 1 is of the type of a MIMO (Multiple Input Multiple Output) system able to control the reception of several signals by means of a plurality of supplementary antennas B' connected to each of the selective amplification units 20.

In this case, each of the selective amplification units 20 comprises:
- a supplementary amplifier 28', of a Low-Noise Amplifier type, arranged downstream of the supplementary antenna B';
- a supplementary analogue/digital converter 22', arranged downstream of the supplementary amplifier 28' and suitable for converting the analogue signals coming from the supplementary antenna B' into corresponding digital signals directed towards the main unit 2;
- a supplementary digital filter 24' arranged downstream of the supplementary analogue/digital converter 22';
- a supplementary digital/analogue converter 26' arranged downstream of the supplementary digital filter 24' and suitable for converting the filtered digital signal into a corresponding analogue signal, before sending towards the fourth combiner/separator modules 19.

Each of the selective amplification units 20 also comprises an input filter 30' arranged upstream of the supplementary amplifier 28' and suitable for filtering the signal coming from the supplementary antenna B'.

The second combiner/separator means 17, in the particular solution shown in FIG. 2, combine together the signals received from the supplementary antennas B' and coming from respective selective amplification units 20 into a single output signal to be sent through the communication channel 4.

The second converter module 10 has a supplementary electrical/optical converter 15' suitable for converting the electrical signal coming from the second combiner/separator means 17 and relating to the signals coming from the supplementary antennas B' into a corresponding optical output signal to be sent through the optical fibre cable 4.

The second multiplexer/demultiplexer 16 is associated with the second optical/electrical converter 14, with the second electrical/optical converter 15 and with the supplementary electrical/optical converter 15' and is suitable for simultaneously sending and receiving optical signals on the optical fibre cable 4.

In the same way, the first converter module 9 has a supplementary optical/electrical converter 12' suitable for converting the optical signal coming from the optical fibre cable 4 and relating to the signals coming from the supplementary antennas B' into a corresponding electrical output signal to be sent towards the base radio stations A.

The first multiplexer/demultiplexer 13 is associated with the first electrical/optical converter 11, with the first optical/electrical converter 12 and with the supplementary optical/electrical converter 12' and is suitable for simultaneously sending and receiving the optical signals on the optical fibre cable 4.

The first combiner/separator means 6, in the particular solution shown in FIG. 2, separate the signal received from the first converter module 9 and related to the signals coming from the supplementary antennas B' into a plurality of output signals to be sent to respective interface modules 5.

Usefully, each of the interface modules 5 comprises a supplementary filter 5a' and a supplementary attenuator 5b' usable to filter and attenuate a respective signal coming from one of the supplementary antennas B'.

Furthermore, each of the interface modules 5 is associated with the respective base radio station A by means of a further connection cable for sending the signal from one of the supplementary antennas B'.

Usefully, the system 1 may have a further connection branch between the base radio stations A and the antennas B (and, if necessary, the supplementary antennas B') used to transport control commands of the remote unit 3 and of the antennas B. Such further branch can be used, in particular, for the so-called "tilt" of the antennas B, i.e., to change their positioning and orientation, and/or to control any device downstream of the remote unit 3.

The method for the distribution of radio-frequency signals according to the invention comprises:
- a first reception/transmission phase of signals between the main unit 2 and at least one base radio station A;
- a communication phase with analogue modulation of the signals between the main unit 2 and at least a remote unit 3, through the communication channel 4;
- a second reception/transmission phase of signals between the remote unit 3 and the antennas B.

Usefully, during the above first and second reception/transmission phase, a plurality of signals is received and transmitted and each signal is modulated inside a respective frequency band, for a specific frequency band, and relates to a specific operator.

The method also envisages a first combination/separation phase performed by means of the first combiner/separator means 6, suitable for:
- combining the input signals coming from the base radio stations A, in particular from the interface modules 5, into a single output signal;
- separating a single input signal coming from the communication channel 4, in particular from the first converter module 9, into a plurality of outputs signals relating to several frequency bands and to several operators to be sent to the base radio stations A.

The above communication phase comprises a first conversion phase, carried out by means of the first converter module 9, of an electrical input signal coming from the first combiner/separator means 6 into a corresponding optical output signal to be sent through the optical fibre cable 4 or, vice versa, into an optical input signal coming from the optical fibre cable 4 into a corresponding electrical output signal to be sent towards first combiner/separator means 6.

The above communication phase also comprises a second conversion phase, carried out by means of the first converter module 9, of an optical input signal coming from the optical fibre cable 4 into a corresponding electrical output signal to be sent towards the second combiner/separator means 17 or, vice versa, of an electrical input signal coming from the second combiner/separator means 17 into a corresponding optical output signal to be sent through the optical fibre cable 4.

The method also envisages a second combination/separation phase performed by means of second combiner/separator means 17, suitable for:
- separating a single input signal coming from the communication channel 4 into a plurality of output signals relating to several frequency bands and several operators, to be sent to respective selective amplification units 20;
- combining a plurality of input signals coming from respective selective amplification units 20 into a single output signal to be sent by means of the communication channel 4.

Advantageously, the method according to the invention also comprises the following phases performed by means of each of the selective amplification units 20:

an analogue/digital conversion phase of the signals coming from the main unit 2 through the communication channel 4 and/or of the signals coming from the antennas B;

a digital filtering phase of the digital signals, subsequent to the analogue/digital conversion phase;

a digital/analogue conversion phase of the digital signals, subsequent to the filtering phase;

an amplification phase of the signals coming from the remote unit 3 through the communication channel 4 and/or of the signals coming from the antennas B.

In particular, with reference to the sending by means of the antennas B of the signals coming from the base radio stations A, the analogue/digital conversion phase envisages the conversion by means of the first analogue/digital converter 21 of the signals coming from the second combiner/separator means 17 and directed towards the antennas B.

Subsequently, the method envisages the digital filtering by means of the first digital filter 23, the digital pre-distortion by means of the digital pre-distortion device 29, the conversion from digital to analogue of the signal thus obtained by means of the first digital/analogue converter 25 and, finally, the amplification of the signal by means of the first amplifier 27.

In the same way, with reference to the signals received from the antennas B, the analogue/digital conversion phase envisages the conversion by means of the second analogue/digital converter 22 of the signals coming from the antennas B and directed towards the second combiner/separator means 17.

Subsequently, the method envisages the digital filtering by means of the second digital filter 24 and the conversion from digital to analogue of the signal thus obtained by means of the second digital/analogue converter 26.

The amplification of the signal is in this case made before the analogue/digital conversion by means of the second amplifier 28.

It has in fact been ascertained how the described invention achieves the set objects.

In particular, it is clear how the use of an analogue modulation of the signals for sending/receiving through the optical fibre communication channel allows using a broad frequency band for the simultaneous transmission/reception of several signals between the main unit and the remote units.

At the same time, the digitalization and subsequent filtering of the signals by means of the selective amplification units, before the distribution of the signals by means of the respective antennas, allow the independent control of the different signals distributed for each of the frequency bands used and for each of the operators.

Another advantage of the invention is that it provides the possibility of using a dedicated antenna connected to a respective selective amplification unit, for each operator and for each frequency band.

Another advantage of the invention is that it provides the possibility of maintaining high power levels at the antenna input, because amplification is done separately for each operator and for each frequency band.

A further advantage of the invention is that it provides the possibility of making the pre-distortion of the digital signal so as to upgrade the results of the amplification.

Another advantage is that it provides the possibility of making statistical readings of the filtered digital signals so as to obtain measurements of the traffic and power of the signals.

A further advantage is that it provides the possibility of reducing the noise produced, reducing the gain of the amplifiers inside the unused channels.

The invention claimed is:

1. System (1) for the distribution of radio-frequency signals, comprising:
   at least a main unit (2);
   at least a remote unit (3);
   at least a communication channel (4) associated with said main unit (2) and with said remote unit (3);
   wherein said main unit (2) is associated with a plurality of first radio communication sets (A), wherein each first radio communication set (A) produces a respective radio-frequency signal relating to a specific frequency band and to a specific operator, said remote unit (3) is associated with a plurality of second radio communication sets (B) installed in a preset area, for the radio coverage of said area, said main unit (2) and said remote unit (3) have analogue modulation means (9, 10) of the signals to be sent on said communication channel (4), and said remote unit (3) comprises a plurality of selective amplification units (20), each of which dedicated to a specific frequency band and to a specific operator, associated with a respective second radio communication set (B) and having:
   analogue/digital conversion means (21, 22) of the signals coming from said main unit (2), through said communication channel (4), and/or of the signals coming from said second radio communication set (B);
   digital filtering means (23, 24) of the digital signals coming out of said analogue/digital conversion means (21, 22);
   amplification means (27, 28) of the signals coming from said main unit (2), through said communication channel (4), and/or of the signals coming from said second radio communication set (B);
   digital/analogue conversion means (25, 26) of the filtered digital signals.

2. System (1) according to claim 1, wherein said analogue/digital conversion means (21, 22) comprise at least a first analogue/digital converter (21) suitable for converting the signals coming from said main unit (2) and directed towards said second radio communication set (B).

3. System (1) according to claim 1, wherein said digital filtering means (23, 24) comprise at least a first digital filter (23) arranged downstream of said first analogue/digital converter (21).

4. System (1) according to claim 3, wherein said digital/analogue conversion means (25, 26) comprise at least a first digital/analogue converter (25) arranged downstream of said first digital filter (23).

5. System (1) according to claim 4, wherein said amplification means (27, 28) comprise at least a first signal amplifier (27) arranged downstream of said first digital/analogue converter (25).

6. System (1) according to claim 5, wherein said selective amplification unit (20) comprises at least a digital pre-distortion device (29) arranged downstream of said first digital filter (23) and upstream of said first amplifier (27).

7. System (1) according to claim 1, wherein said analogue/digital conversion means (21, 22) comprise at least a second analogue/digital converter (22) suitable for converting the signals coming from said second radio communication set (B) and directed towards said main unit (2).

8. System (1) according to claim 7, wherein said digital filtering means (23, 24) comprise at least a second digital filter (24) arranged downstream of said second analogue/digital converter (22).

9. System (1) according to claim 8, wherein said digital/analogue conversion means (25, 26) comprise at least a second digital/analogue converter (26) arranged downstream of said second digital filter (24).

10. System (1) according to claim 1, wherein said amplification means (27, 28) comprise at least a second signal amplifier (28) arranged downstream of said second radio communication set (B).

11. System (1) according to claim 1, wherein said main unit (2) comprises at least an interface module (5) associated with at least one of said first radio communication sets (A), said first radio communication set (A) being suitable for sending at least an electrical signal towards said interface module (5), or vice versa.

12. System (1) according to claim 11, wherein it comprises a plurality of said interface modules (5), suitable for receiving/sending respective signals from/towards said first radio communication set (A) relating to different frequency bands and/or different operators.

13. System (1) according to claim 12, wherein said main unit (2) comprises first combiner/separator means (6) placed in between said interface modules (5) and said communication channel (4), said first combiner/separator means (6) being suitable for combining a plurality of input signals coming from respective interface modules (5) in a single output signal to be sent to said communication channel (4) and/or for separating a single input signal coming from said communication channel (4) into a plurality of output signals to be sent to respective interface modules (5).

14. System (1) according to claim 1, wherein said communication channel (4) comprises at least an optical fibre cable (4).

15. System (1) according to claim 14, wherein said analogue modulation means (9, 10) of the main unit (2) comprise at least a first converter module (9) associated with said optical fibre cable (4) and suitable for converting an electrical input signal coming from said first radio communication set (A) into a corresponding optical output signal to be sent through said optical fibre cable (4) or, vice versa, suitable for converting an optical input signal coming from said optical fibre cable (4) into a corresponding electrical output signal to be sent towards said first radio communication set (A).

16. System (1) according to claim 15, wherein said analogue modulation means (9, 10) of the remote unit (3) comprise at least a second converter module (10) associated with said optical fibre cable (4) and suitable for converting an input optical signal coming from said optical fibre cable (4) into a corresponding electrical output signal to be sent to said selective amplification module or, vice versa, suitable for converting an electrical input signal coming from said selective amplification module into a corresponding optical output signal to be sent through said optical fibre cable (4).

17. System (1) according to claim 1, wherein said remote unit (3) comprises second combiner/separator means (17) placed in between said communication channel (4) and said selective amplification units (20), said second combiner/separator means (17) being suitable for separating a single input signal coming from said communication channel (4) into a plurality of output signals to be sent to respective selective amplification units (20) and/or for combining a plurality of input signals coming from respective selective amplification units (20) into a single output signal to be sent towards said communication channel (4).

18. System (1) according to claim 1, wherein it comprises at least a supplementary connection branch between said main unit (2) and said remote unit (3) suitable for transporting control commands of the remote unit (3) itself and/or of the devices associated with it.

19. Method for the distribution of radio-frequency signals, wherein it comprises:
at least a first reception/transmission phase of signals between a main unit (2) and a plurality of first radio communication sets (A), wherein each first radio communication set (A) produces a respective radio-frequency signal relating to a specific frequency band and to a specific operator;
at least a communication phase with analogue modulation of the signals between said main unit (2) and at least a remote unit (3), through at least a communication channel (4);
at least a second reception/transmission phase of signals between said remote unit (3) and a plurality of second radio communication sets (B) installed in a predetermined area, for the radio coverage of said area;
wherein, for each specific frequency band and specific operator, the method comprises:
at least an analogue/digital conversion phase of the signals coming from said main unit (2), through said communication channel (4), and/or of the signals coming from said second radio communication sets (B);
at least a digital filtering phase of said signals, after said analogue/digital conversion phase;
at least an amplification phase of the signals coming from said remote unit (3), through said communication channel (4), and/or of the signals coming from said second radio communication sets (B);
at least a digital/analogue conversion phase of said signals, after said digital filtering phase.

20. Method according to the claim 19, characterized by the fact that said analogue/digital conversion phase is suitable for converting the signals coming from said main unit (2), through said communication channel (4), and directed towards said second radio communication sets (B).

21. Method according to the claim 20, characterized by the fact that said amplification phase is performed after said digital filtering phase.

22. Method according to the claim 21, characterized by the fact that it comprises at least a digital pre-distortion phase of said signals performed after said digital filtering phase and before said amplification phase.

23. Method according to the claim 22, characterized by the fact that said analogue/digital conversion phase is suitable for converting the signals coming from said second radio communication sets (B) and directed towards said main unit (2).

24. Method according to the claim 23, characterized by the fact that said amplification phase is performed before said analogue/digital conversion phase.

25. Method according to claim 19, wherein it comprises at least a first combination/separation phase suitable for combining a plurality of input signals coming from said first radio communication sets (A) into a single output signal, before said communication phase, and/or suitable for separating a single input signal into a plurality of output signals to be sent to said first radio communication sets (A), after said communication phase.

26. Method according to claim 19, wherein it comprises at least a second combination/separation phase suitable for separating a single input signal coming from said communication channel (4) into a plurality of output signals to be sent to said second radio communication sets (B) and/or for combining a plurality of input signals coming from said second radio communication sets (B) into a single output signal to be sent towards said communication channel (4).

* * * * *